(12) United States Patent
Leone

(10) Patent No.: US 7,832,197 B2
(45) Date of Patent: Nov. 16, 2010

(54) SYSTEM AND METHOD FOR REDUCING NOX EMISSIONS IN AN APPARATUS HAVING A DIESEL ENGINE

(75) Inventor: Thomas Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1457 days.

(21) Appl. No.: 11/231,597

(22) Filed: Sep. 20, 2005

(65) Prior Publication Data

US 2007/0062179 A1    Mar. 22, 2007

(51) Int. Cl.
*F01N 3/00* (2006.01)
(52) U.S. Cl. .............. 60/285; 60/274; 60/278; 60/301
(58) Field of Classification Search ............ 60/274, 60/284, 285, 299, 278, 301
See application file for complete search history.

(56) References Cited

U.S. PATENT DOCUMENTS

| 5,224,460 | A | 7/1993 | Havstad et al. |
| 5,497,737 | A | 3/1996 | Nakamura |
| 5,931,124 | A | 8/1999 | Kerkau et al. |
| 6,293,246 | B1 * | 9/2001 | Tanahashi et al. ........... 123/305 |
| 6,405,694 | B2 | 6/2002 | Sato |
| 6,519,933 | B2 * | 2/2003 | Ogiso et al. ................... 60/285 |
| 6,658,840 | B2 * | 12/2003 | Iiyama et al. ................. 60/285 |
| 2004/0123588 | A1 | 7/2004 | Stanglmaier et al. |
| 2004/0231639 | A1 | 11/2004 | Israel et al. |

* cited by examiner

*Primary Examiner*—Thomas E Denion
*Assistant Examiner*—Diem Tran
(74) *Attorney, Agent, or Firm*—Allan J. Lippa; Alleman Hall McCoy Russell & Tuttle LLP

(57) ABSTRACT

A method for a diesel engine includes retarding intake valve timing and advancing exhaust valve timing based on reduced exhaust gas that enters an aftertreatment device. In this way, it is possible to increase the internal exhaust gas recirculation and the temperature of exhaust emitted by the diesel engine.

15 Claims, 10 Drawing Sheets

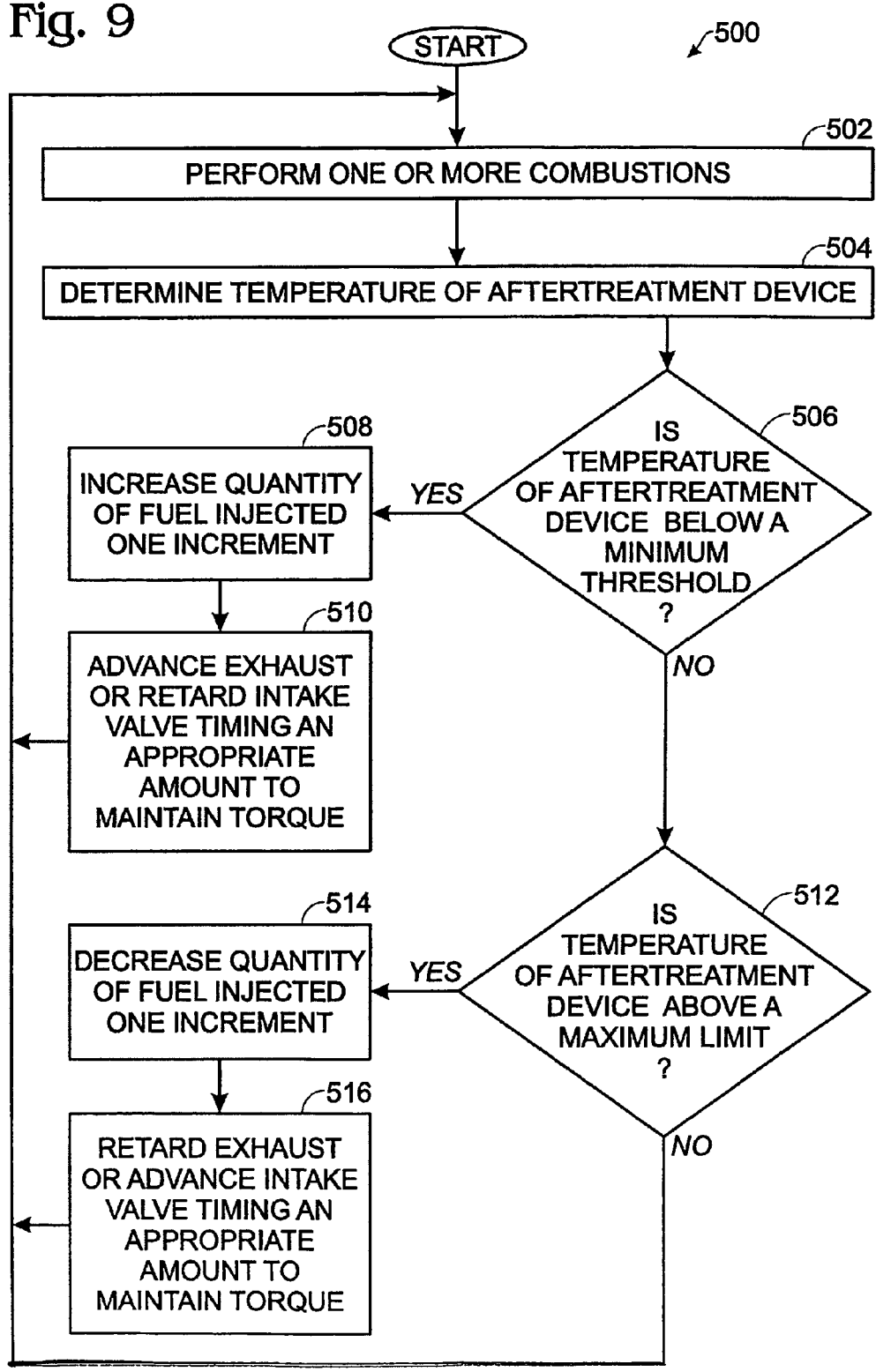

SYSTEM AND METHOD FOR REDUCING NOX EMISSIONS IN AN APPARATUS HAVING A DIESEL ENGINE

TECHNICAL FIELD

The present application relates to the field of automotive emission control systems and methods.

BACKGROUND AND SUMMARY

Diesel engines may be used to generate efficient combustion and conversion of fuel into work. However, efficient diesel combustion may create conditions that can be undesirable for an aftertreatment device. For example, while various types of combustion may improve engine efficiency and decrease concentrations of NOx and particulate emissions, it may also lead to lower exhaust temperatures, which may negatively impact the performance of various aftertreatment devices, particularly when a diesel engine is operating at a light load and/or at idle.

One approach to control the temperature of exhaust gas passing through an aftertreatment device in diesel engines is described in U.S. Application No. 2004/0060284 A1. In the '284 reference, intake and/or exhaust valve timing, either singly or in combination with fuel injection timing and selective individual cylinder cutout, are controlled in response to sensed engine operating parameters. The exhaust valve opening event allows energy previously available to the piston to be transported to the exhaust system in the form of thermal energy carried by the exhaust mass flow. Thus, exhaust temperature can be controlled by the intake valve and exhaust valve timing.

However, the inventors herein have recognized that operation according to '286 may increase NOx production while attempting to achieve an increased exhaust gas temperature optimal for aftertreatment devices. Furthermore, the inventor herein has recognized that some types of variable valve timing operation may degrade engine efficiency and increase pumping work. For example, although early exhaust opening increases the exhaust gas temperature, it may also entail early exhaust valve closing time, which can decrease engine efficiency by increasing pumping work. Thus, the approach of '286 may adjust intake valve timing or exhaust valve timing to increase the exhaust temperature while sacrificing engine efficiency and pumping work.

Another approach to diesel engine operation to achieve improved combustion is described in U.S. Pat. No. 6,405,694. This approach uses a control device that controls valve timing based on engine speed or load. In one embodiment, an exhaust valve advanced-closing control is executed so that the exhaust valve is closed at an earlier timing than the intake top dead center (TDC) and the intake valve is opened nearly at the intake TDC or at a later timing. This approach allegedly provides improved fuel atomization within the cylinder and reduced effects caused by deteriorated combustion.

However, the inventor herein has recognized that the control device in the '694 reference is independent of exhaust temperature concerns. As such, variation in exhaust gas temperature caused by said operation may cause the exhaust gas to become too hot or too cool for emission control devices.

SUMMARY

The above issues may be addressed, in one embodiment, by a method of operating an engine that includes performing at least one combustion in the combustion chamber at a first exhaust valve timing and a first intake valve timing; determining a temperature of the exhaust gas that enters the aftertreatment device; and if the temperature of the exhaust gas is equal to or below a preselected temperature threshold, then performing at least one combustion in the combustion chamber at a second, earlier exhaust valve closure timing and a second, later intake valve opening timing to thereby increase the internal exhaust gas recirculation and the temperature of exhaust emitted by the diesel engine, without large increases in pumping work.

According to another aspect, a method of operating the engine includes performing at least one combustion in the combustion chamber at a first exhaust valve opening timing; determining an exhaust gas recirculation; and if the amount of exhaust gas recirculation is outside a range, then performing at least one combustion in the combustion chamber at a second earlier exhaust valve closure timing and second later intake valve opening timing.

The method described in the above embodiment reduces NOx emissions through controlling the combustion process and providing desired conditions for aftertreatment devices. For example, early exhaust valve closure timing is one way to get internal EGR which reduces the NOx emissions. At the same time, early exhaust valve closure timing and late intake valve opening also increase the exhaust temperature emitted from an engine. Thus, the combination of early exhaust valve timing with late intake valve timing has an added effect to decrease NOx emissions. The variable valve timings are adjusted by determining parameters relating to both the combustion of an engine and the operation of an aftertreatment device. Therefore, both combustion process and operation of an aftertreatment device can be optimized for NOx reduction.

Furthermore, this combination of early exhaust valve timing and late intake valve timing has little negative effect on the engine efficiency and pumping work.

BRIEF DESCRIPTION OF THE DRAWINGS

FIG. 9 is a flow diagram of an embodiment of another method of operating an engine for controlling a temperature of an aftertreatment device.

DETAILED DESCRIPTION OF THE DEPICTED EMBODIMENTS

Figure 1:
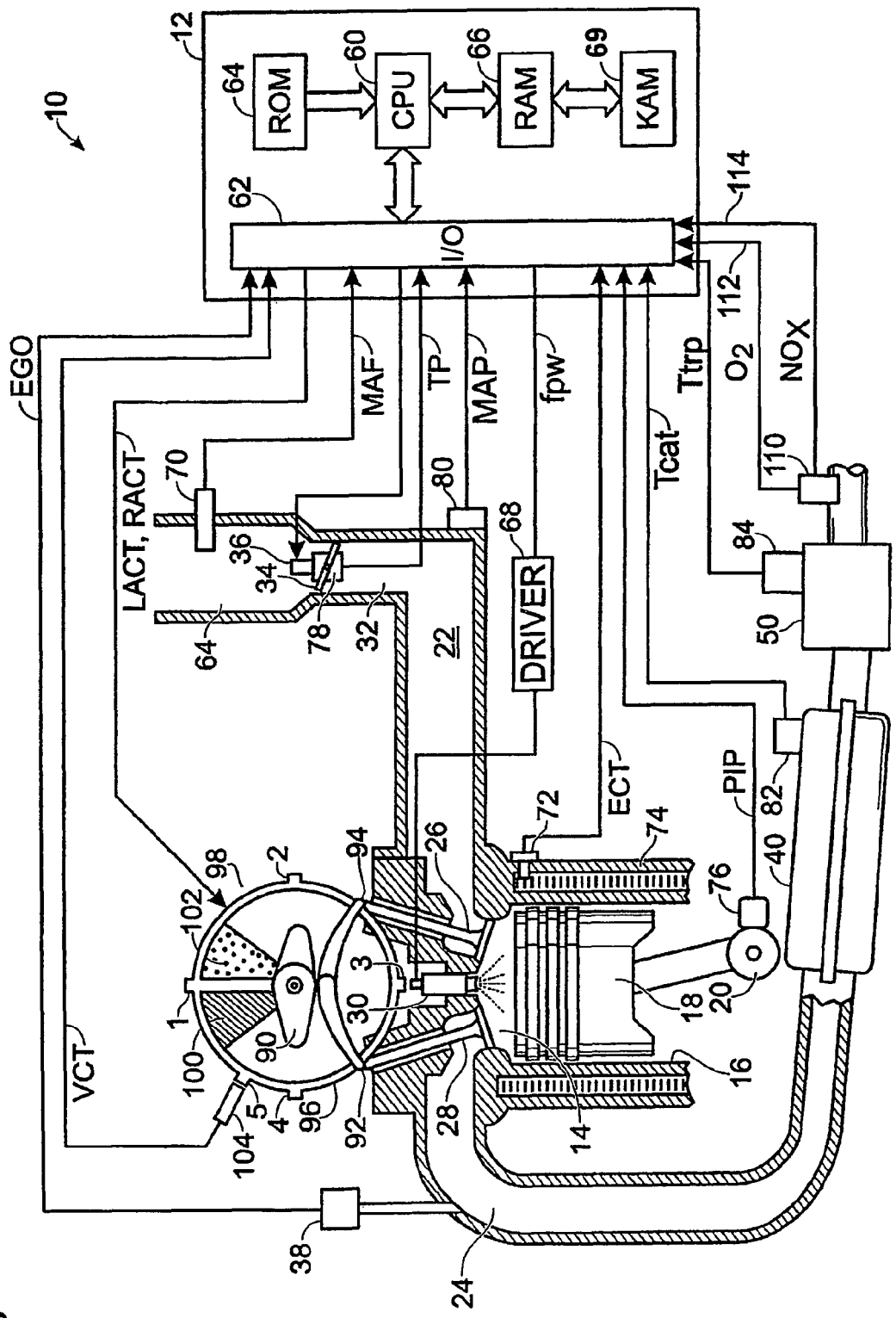
FIG. 1 is a schematic depiction of an exemplary embodiment of a diesel engine.

FIG. 1 shows, generally at 10, an exemplary embodiment of one cylinder of a multi-cylinder diesel engine, intake and exhaust paths connected to that cylinder, and an exemplary embodiment of a camshaft having a variable timing mechanism for controlling the valves of the cylinder. It will be appreciated that the configuration of engine 10 is merely exemplary, and that the systems and methods described herein may be implemented in any other suitable engine.

Continuing with FIG. 1, engine 10 is controlled by electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve 26 and exhaust valve 28. Fuel injector 30 is coupled to combustion chamber 14 for delivering injected fuel directly therein in proportion to the fuel pulse width (fpw) signal received from controller 12 via conventional electronic driver 68. Fuel is delivered to fuel injector 30 by a conventional high pressure fuel system (not shown) including a fuel tank, fuel pumps, and a fuel rail.

Intake manifold 22 is shown communicating with throttle body 32 which contains throttle plate 34. In this particular example, throttle plate 34 is coupled to electric motor 36 so that the position of throttle plate 34 is controlled by controller 12 via electric motor 36. In an alternative embodiment (not shown), throttle body 32 and throttle plate 34 are omitted.

Exhaust gas sensor 38 is shown coupled to exhaust manifold 24 upstream of an aftertreatment device 40. Exhaust gas sensor 38 may be any of many known sensors for providing an indication of exhaust gas air/fuel ratio such as a linear oxygen sensor, a two-state oxygen sensor, or a hydrocarbon (HC) or carbon monoxide (CO) sensor. In this particular example, sensor 38 is a two-state oxygen sensor that provides signal EGO to controller 12 which converts signal EGO into two-state signal EGOs.

Aftertreatment device 40 may include any suitable type of device for reducing emissions from engine 10. Examples include, but are not limited to, three-way and four-way catalytic converters, particulate filters, etc.

A lean nitrogen oxide (NOx) adsorbent or trap 50 is shown positioned downstream of catalytic converter 40. NOx trap 50 is configured to adsorb NOx when engine 10 is operating with a lean air to fuel ratio. Controller 12 may be configured to periodically raise the temperature of NOx trap 50 and provide a rich exhaust stream to NOx trap 50 (for example, by performing an additional injection of fuel after top dead center of the compression stroke) to react adsorbed NOx with HC and CO to purge the trap of stored NOx.

Controller 12 is shown in FIG. 1 as a conventional microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled to throttle body 32; engine coolant temperature (ECT) from temperature sensor 72 coupled to cooling sleeve 74; a profile ignition pickup signal (PIP) from Hall effect sensor 76 coupled to crankshaft 20; throttle position TP from throttle position sensor 78; and absolute Manifold Absolute Pressure (MAP) signal from sensor 80.

Controller 12 may determine the temperature of catalytic converter 40 and NOx trap 50 in any suitable manner. For example, the temperature Tcat of catalytic converter 40 and the temperature Ttrp of NOx trap 50 may be inferred from engine operation. In an alternate embodiment, temperature Tcat is provided by temperature sensor 82 and temperature Ttrp is provided by temperature sensor 84.

Engine 10 may be configured to have variable intake valve and exhaust valve timing capabilities. For example, engine 10 may include electromechanically actuated valves that are controlled by controller 12. Alternatively, as shown in the depicted embodiment, engine 10 may include a mechanism to mechanically vary the intake and/or exhaust valve timings, for example by adjusting the timing of a camshaft. In the depicted embodiment, camshaft 90 of engine 10 is shown communicating with rocker arms 92 and 94 for actuating intake valve 26 and exhaust valve 28. Camshaft 90 is directly coupled to housing 96. Housing 96 forms a toothed wheel having a plurality of teeth 98. Housing 96 is hydraulically coupled to an inner driving member (not shown), which is in turn directly linked to crankshaft 20 via a timing chain (not shown). Therefore, housing 96 and camshaft 90 rotate at a speed substantially equivalent to the inner driving member. The inner driving member rotates at a constant speed ratio to crankshaft 20. However, by manipulation of the hydraulic coupling as will be described later herein, the relative position of camshaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between camshaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between camshaft 90 and crankshaft 20 is retarded. Thus, intake valve 26 and exhaust valve 28 open and close at a time later than normal relative to crankshaft 40.

Teeth 98, being coupled to housing 96 and camshaft 90, allow for measurement of relative cam position via cam timing sensor 104 providing variable camshaft timing (VCT) signal to controller 12. In the depicted embodiment, four teeth (labeled 1, 2, 3 and 4) are provided for measurement of cam timing and are equally spaced (for example, 90 degrees apart from one another) while tooth 5 at a different spacing may be used for cylinder identification. In addition, controller 12 sends control signals to conventional solenoid valves (not shown) to control the flow of hydraulic fluid either into advance chamber 100, retard chamber 102, or neither.

Relative cam timing may be measured using the method described in U.S. Pat. No. 5,548,995, which is incorporated herein by reference. In general terms, the time, or rotation angle between the rising edge of the PIP signal and receiving a signal from one of the plurality of teeth 98 on housing 96 gives a measure of the relative cam timing.

Sensor 110 provides an indication of both oxygen concentration in the exhaust gas as well as NOx concentration. Signal 112 provides controller 12 a voltage indicative of the $O_2$ concentration while signal 114 provides a voltage indicative of NOx concentration.

It will be understood that FIG. 1 merely shows one cylinder of a multi-cylinder engine, and that each cylinder has its own set of intake/exhaust valves, fuel injectors, etc. It will further be understood that the depicted diesel engine 10 is shown only for the purpose of example, and that the systems and methods described herein may be implemented in or applied to any other suitable engine having any suitable components and/or arrangement of components. For example, intake valve 26 and exhaust valve 28 may be electromechanically actuated, and camshaft 90 (and various associated parts) may be omitted. Likewise, separate camshafts may be used to control the opening of intake valve 26 and exhaust valve 28. Where each valve is operated by a separate camshaft, each camshaft may include a variable timing mechanism such as that shown for camshaft 90 in FIG. 1 to allow the exhaust valve timing to be varied independent of the intake valve timing, and vice versa (dual independent variable cam timing).

As described above, low-temperature diesel combustion can help reduce emissions such as NOx and particulate emissions in a diesel engine. Low-temperature diesel combustion may be achieved, for example, by early homogenization combustion. In general, early homogenization in a diesel engine can be described as a combustion mode in which fuel and air are mixed substantially before top dead center and combustion starts near top dead center. Early homogenization can involve multiple in-cylinder injection strategies and/or fuel injections, and either premixing in the intake manifold or direct injection, and may be applied on various combustion chamber configurations. This mode of combustion is typically characterized by very low particulate and NOx emissions; however, relatively low exhaust temperatures at a given load are also typical.

Early homogenization combustion may be contrasted with diffusion combustion, which is conventionally used in diesel engines. Diffusion combustion can be generally described as a combustion mode in which at least part of fuel injection and part of combustion occur simultaneously. Consequently, it involves later fuel-air mixing with respect to the combustion event. In this combustion mode, multiple injections strategies such as pilot, split main, and post injection can be used to control emissions and combustion rate. This mode of combustion is typically characterized by higher particulate and NOx emissions than early homogenization combustion. For this reason, early homogenization combustion may be advantageously utilized in place of diffusion combustion as a default combustion mode to help reduce NOx and particulate emissions.

While low-temperature diesel combustion may significantly lower NOx emissions compared to conventional diesel combustion, NOx emissions may still be too high to meet current and/or future emissions standards. Therefore, NOx trap 50 may be used in combination with early homogenization combustion to further reduce NOx emissions. As described above, NOx trap is configured to retain NOx when the engine is running a lean air/fuel mixture, and then to release and reduce the NOx when the engine runs a richer air/fuel mixture. A typical NOx trap includes one or more precious metals, and an alkali or alkaline metal oxide to which nitrogen oxides adsorb as nitrates when the engine is running a lean air/fuel mixture. The engine can then be configured to periodically run a richer air/fuel mixture. The nitrates decompose under rich conditions, releasing the NOx which then reacts with the carbon monoxide, hydrogen gas and various hydrocarbons in the exhaust over the precious metal to form $N_2$, thereby decreasing the NOx emissions and regenerating the trap.

Figure 2:
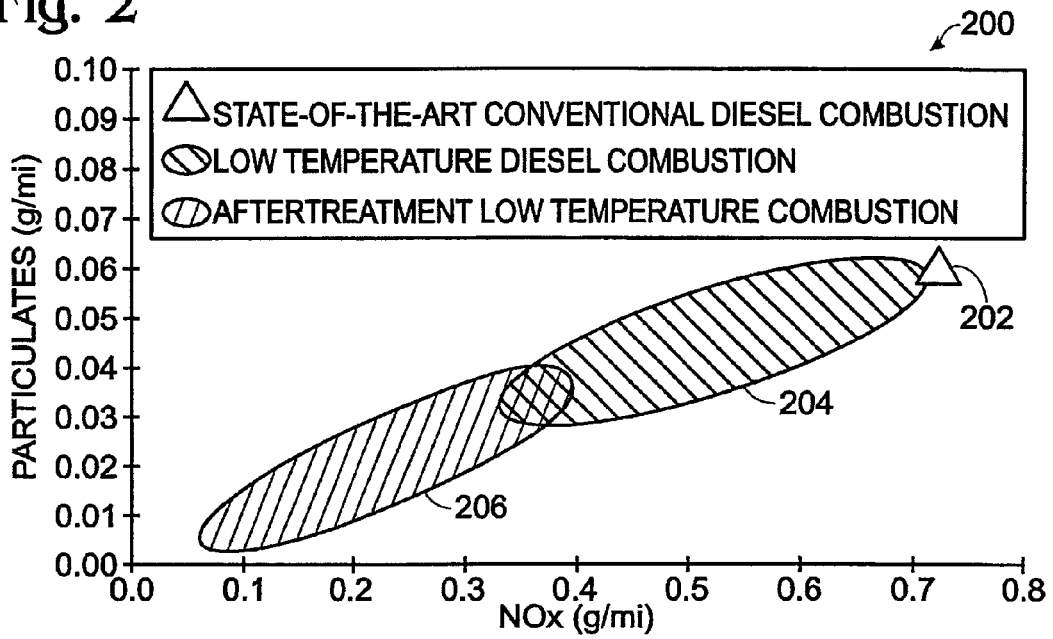
FIG. 2 is a graph showing a comparison of ranges of particulate and NOx emissions from a diesel engine utilizing only low temperature diesel combustion and a diesel engine utilizing low temperature diesel combustion in combination with catalytic aftertreatment.

FIG. 2 shows, generally at 200, a plot of particulate and NOx concentration ranges for various diesel emission systems. First, the current state-of-the-art particulate and NOx emissions concentrations are shown at 202. Next, an exemplary range of NOx and particulate concentrations achievable in emissions from an engine utilizing low temperature diesel combustion is shown as area 204. Finally, an exemplary range of NOx and particulate concentrations achievable in emissions from an engine utilizing both low temperature diesel combustion and aftertreatment (in the form of a NOx trap and a particulate filter) is shown as area 206. It will be appreciated that the performance of other aftertreatment devices may exhibit similar dependencies on device and/or exhaust temperatures.

Figure 3:
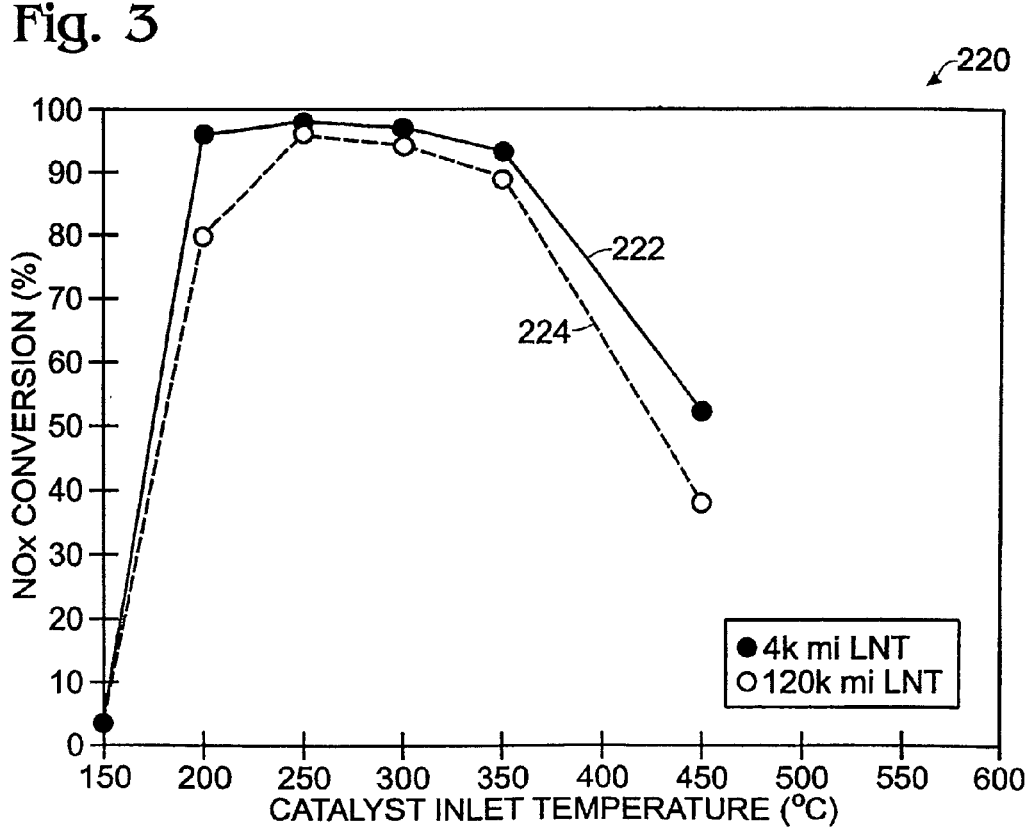
FIG. 3 is a graph showing a temperature dependence of a NOx conversion efficiency of an exemplary catalyst as a function of an inlet temperature of the catalyst.

As is evident from FIG. 2, the use of a combination of low temperature diesel combustion and catalytic aftertreatment may allow much lower NOx emissions to be achieved relative to the use of either method alone. However, some difficulties may be encountered in utilizing these methods together. For example, the NOx conversion efficiency of a NOx trap is dependent upon the temperature of the trap. FIG. 3 shows, generally at 220, a plot of the temperature dependence of an exemplary NOx trap after aging for 4,000 miles (at 222) and after aging for 120,000 miles (at 224). From FIG. 3, it can be seen that the NOx conversion efficiency of the exemplary NOx trap falls off at trap temperatures below approximately 200 degrees Celsius and above approximately 350 degrees Celsius. Therefore, maintaining the NOx trap approximately between these temperatures helps to ensure proper operation of the trap. It will be appreciated that these temperatures are merely exemplary, and that other NOx traps may have different operating temperature ranges, depending upon trap age/ degradation level, composition, etc.

Figure 4:
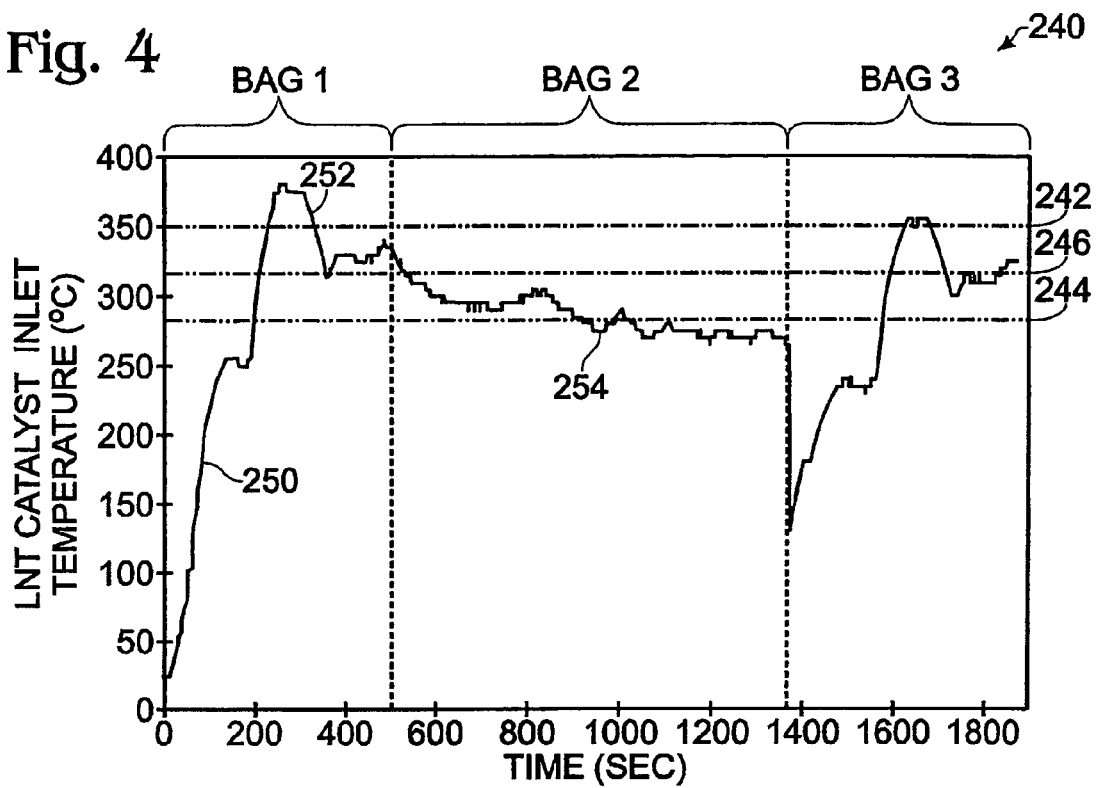
FIG. 4 is a graph showing an inlet temperature of an exemplary catalyst as a function of time for a diesel engine utilizing early homogenization combustion.

Due to the lower combustion temperatures and higher efficiency of early homogenization combustion, the exhaust from an engine utilizing early homogenization combustion may be too cool to keep the NOx trap within the optimal operating temperature range. FIG. 4 shows, generally at 240, a plot showing catalyst temperature as a function of time during an Environmental Protection Agency standard emissions test of a diesel automobile. The labels Bag 1, Bag 2 and Bag 3 refer to the emissions collected during three phases of the test: Bag 1 emissions are collected during a cold-start test, Bag 2 emissions are tested under city driving conditions, and Bag 3 emissions are tested after ten minutes with the engine off (hot engine restart). Also, a desired temperature range of a NOx trap is indicated by an upper temperature line 242 (shown at approximately 350 degrees Celsius), a lower temperature line 244 (shown at approximately 280 degrees Celsius), and a midpoint line 246 (shown at approximately 315 degrees Celsius). It should be noted that the relevant temperature window may depend upon catalyst type, formulation, and age/level of degradation. This can be seen, for example, in the different operating temperature ranges shown in FIGS. 3 and 4. Therefore, these factors may be taken into account when determining a temperature control strategy. Furthermore, the target temperature window may be adjusted depending on catalyst age as measured, for example, by miles of use, hours of use, total amount of fuel injected, or measured more directly via NOx or oxygen sensors, etc.

The NOx trap temperature as a function of time is shown at line 250. It can be seen that the NOx trap temperature sometimes exceeds the optimal operating temperature range, as indicated at 252, and sometimes falls below the optimal temperature range, as indicated at 254. Therefore, at these points in time, emissions from the automobile may have higher NOx emission levels than when the NOx trap is within the optimal temperature range.

Conventionally, a late injection of fuel has been used to increase diesel engine exhaust temperatures. However, the late injection of fuel may cause a decrease in fuel economy. Therefore, in order to keep the temperature of the NOx trap within a desired operating range while also reducing NOx emissions via early homogenization combustion, controller 12 may be configured to utilize variable intake and/or exhaust valve timing strategies to maintain the temperature of NOx trap 50. In this manner, the benefits of early homogenization combustion may be realized with less of a loss in fuel efficiency than that caused by late injection, while preserving good NOx trap performance. While described below in the context of a NOx trap, it will be appreciated that the intake and/or exhaust valve timing strategies described herein may be used to control the temperature of any other suitable aftertreatment device, or of another device or system, such as the temperature of a coolant in a cooling system.

In one embodiment, controller 12 may be configured to retard the timing of intake valve 26 to decrease the engine's air flow volumetric efficiency and thereby increase the temperature of the exhaust provided to NOx trap 50. In this manner, engine 10 may be run primarily in an early homogenization mode for increased fuel efficiency and decreased emissions, and higher temperature exhaust may be provided to NOx trap 50 on an as-needed basis when the NOx trap temperature falls below a desired operating temperature or temperature range.

Figure 5:
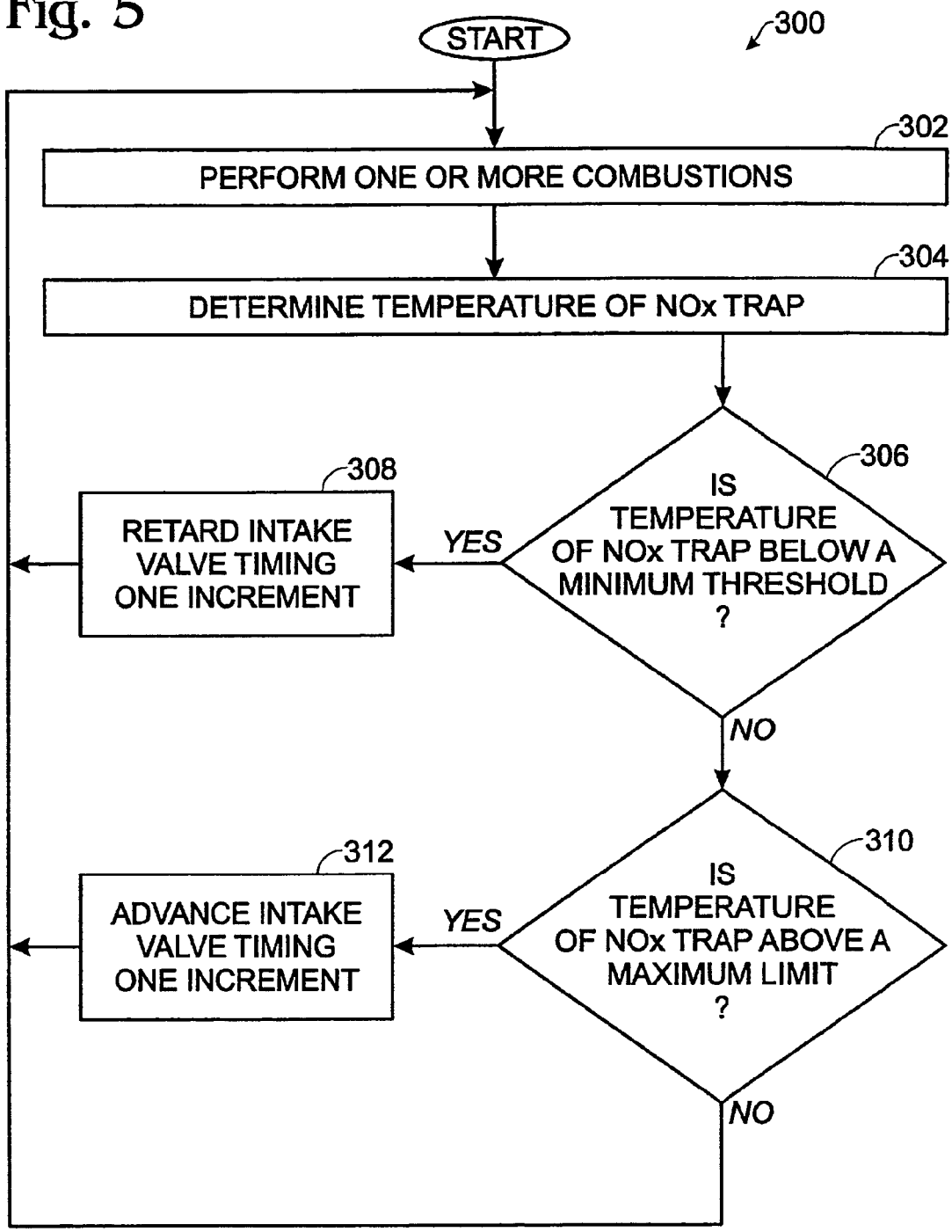
FIG. 5 is a flow diagram of an embodiment of a method of operating an engine for controlling a temperature of an aftertreatment device.

FIG. 5 shows, generally at 300, a flow diagram depicting an exemplary method of controlling an exhaust temperature provided to NOx trap 50 via the control of a timing of intake valve 26. Method 300 first includes, at 302, performing one or more combustions in combustion chamber 14 at a first intake valve timing, which may be a default intake valve timing configured, for example, for best engine cold start. For example, in some embodiments, the first intake valve timing is configured to cause the engine to operate in a high efficiency early homogenization combustion mode. Next, method 300 includes determining the temperature of the NOx trap at 304, and then comparing the determined temperature of the NOx trap at 306 to a predetermined minimum temperature threshold. If the temperature of the NOx trap is determined at 306 not to be below the predetermined minimum temperature threshold, then the NOx trap temperature is compared at 310 to a predetermined maximum temperature limit. If the temperature is not above the maximum at 310, then combustion is continued at 302 with the same intake valve timing, the temperature is measured again at 304, and compared to the minimum threshold at 306, etc. On the other hand, if the temperature of NOx trap 50 is determined at 306 to be below the predetermined minimum temperature threshold, then an incremental retard of the intake valve timing is performed at 308 to provide a higher temperature exhaust to NOx trap 50. After performing the combustion with the second intake valve timing, the temperature of NOx trap 50 is again determined at 304, and is then compared to the predetermined minimum threshold at 306. If the temperature of NOx trap 50 is determined at 310 to be above the predetermined maximum temperature limit, then an incremental advance of intake valve timing is performed at 312 and combustion cycles with the new intake valve timing are performed. The size of the retard and advance increments performed at 308 and 312 may be determined by hardware limitations or may be proportional to the amount of deviation of the temperature beyond the threshold at 306 and maximum limit at 310. It will be appreciated that, where coolant temperature in the engine is being controlled, the coolant temperature may be determined and compared to the threshold or thresholds, rather than the NOx trap temperature. During normal engine operation, this control loop is repeated at predetermined intervals to maintain continual control of the temperature. Exceptions to this continual repetition can occur during engine warm-up from cold start when the engine may not operate properly throughout the full range of possible intake valve timings, during engine shut-down when the camshaft is being put into the proper position for facilitating the next engine start, or during a sudden change of operating conditions where the appropriate change in intake valve timing can be anticipated.

The timing of intake valve 26 may be adjusted in any suitable manner. For example, where engine 10 utilizes an electromechanically controlled intake valve, controller 12 may be configured to vary the timing of an actuation signal supplied to the intake valve. Alternatively, as in the depicted embodiment, controller 12 may be configured to vary the timing of the rotation of camshaft 90 relative to crankshaft 20. As described above, in some vehicles, separate camshafts may be utilized to open the intake and exhaust valves, while in other vehicles, a single camshaft may open both the intake and exhaust valves. Therefore, different timing strategies may be employed for different engine configurations.

Figure 6:
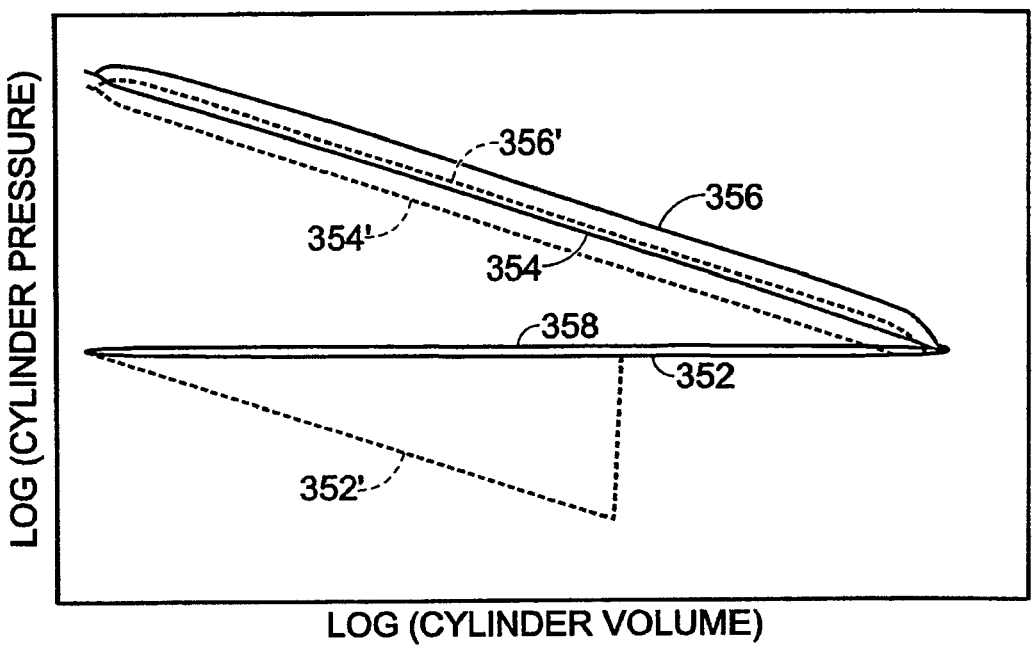
FIG. 6 is a graphical representation of the pressure and volume of a cylinder in a diesel engine during an entire four stroke cycle according to one implementation of the method of FIG. 5.

In embodiments that utilize variable camshaft timing to adjust the intake valve timing, retarding the closing of the intake valve also may retard the opening of the intake valve. This is depicted graphically in FIG. 6, which shows a log (cylinder pressure) v. log(cylinder volume) plot 350 for an engine utilizing a sixty degree intake camshaft retardation (with no exhaust valve timing variation) compared to conventional timing. The conventionally timed intake stroke is shown at 352, the conventionally timed compression stroke is shown at 354, the conventionally timed combustion stroke is shown at 356, and the conventionally timed exhaust stroke is shown at 358. The effect of the intake valve retardation on the intake stroke is shown at 352', the effect on the compression stroke is shown at 354', and the effect on the combustion stroke is shown at 356'.

First regarding the effect to the intake stroke, the late opening of the valve causes the piston to pull a vacuum during the early phase of an intake stroke. This adds pumping work, thereby resulting in some degree of engine braking. Regarding the effect on the compression and combustion strokes, it can be seen that the late intake valve closing causes the pressure in the cylinder to be lower for both the compression and combustion strokes compared to conventional valve timing. This indicates that the air mass in the cylinder is lower for the late valve closing cycle, and therefore that higher exhaust temperatures may be achieved via the injection of a similar amount of fuel as for the conventionally timed cycle. The selected degree of retardation of the intake valve closing therefore may be optimized to give an acceptable amount of exhaust heating while avoiding too great a degree of fuel efficiency loss due to late intake valve opening.

The temperature thresholds to which the NOx trap temperature is compared at 306 and 310 (FIG. 5) may have any suitable value. From FIGS. 2 and 3, it can be seen that NOx traps of different compositions and ages may have different optimum operating temperature ranges. Therefore, the temperature thresholds utilized at 306 and 310 may be different for different NOx traps. Furthermore, the temperature thresholds may be varied by controller 12 over the lifetime of a NOx trap to adjust for differences in performance caused by NOx trap aging.

The temperature of NOx trap 50 may be determined at 304 in any suitable manner. For example, the temperature may be inferred from engine variables such as an amount of fuel injected, an injection pressure, an air charge mass used for combustion, etc., or measured by temperature sensor 84. Furthermore, the temperature of NOx trap 50 may be determined between each engine cycle, or at any greater or lesser frequency and/or at any other suitable timing.

It will be appreciated that the control of the timing of intake valve 26 may be combined with other methods for increasing exhaust temperatures as desired. For example, intake valve timing control may be combined with a later injection of fuel into combustion chamber 14 to further increase exhaust temperatures. As used herein, the term "later injection" refers to injections of fuel at timings configured to result in diffusion or late homogenization combustion, as these combustion modes are known to produce higher temperature exhausts relative to early homogenization combustion injection timings.

In yet another embodiment, an exhaust valve timing may be adjusted in combination with a later injection of fuel to increase exhaust temperatures. For example, advancement of the exhaust valve opening may cause less work to be extracted from the burning air/fuel mixture during the combustion stroke, and therefore may lead to higher exhaust temperatures. The use of a later injection of fuel with the advancement of the exhaust valve opening may provide even higher exhaust temperatures than the advancement of the exhaust valve opening alone, and therefore may be used to heat NOx trap 50 more rapidly.

Figure 7:
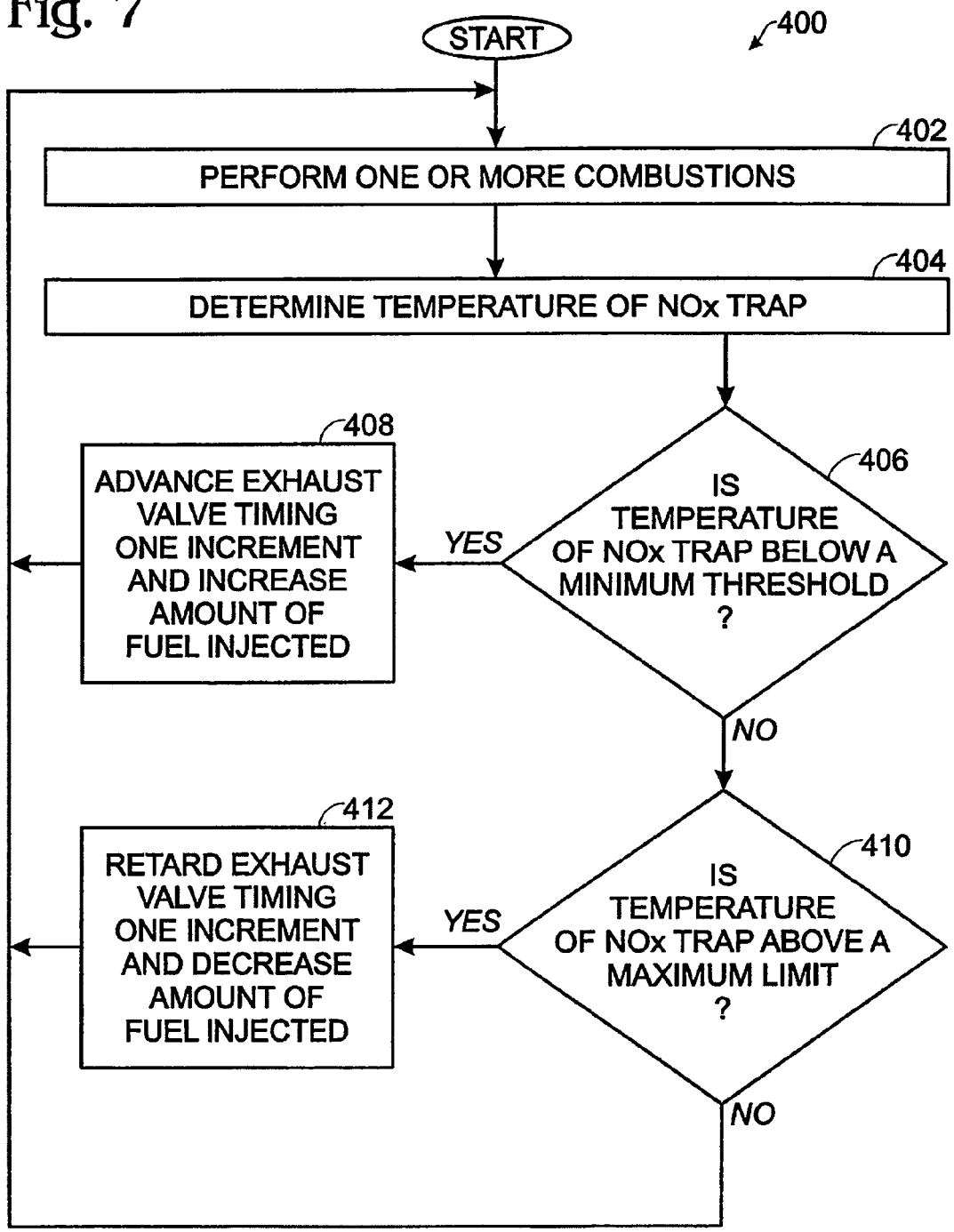
FIG. 7 is a flow diagram of an embodiment of another method of operating an engine for controlling a temperature of an aftertreatment device.

One exemplary embodiment of a method of providing higher exhaust temperatures by a combination of earlier exhaust valve timing and later fuel injection is shown generally at 400 in FIG. 7. Method 400 includes, at 402, performing one or more combustions in combustion chamber 14 at a first exhaust valve timing, which may be a default exhaust valve timing in some embodiments. Typically, during either early homogenization combustion or diffusion combustion, exhaust valve 28 opens near bottom dead center of the expansion stroke, and closes at or near top dead center of the exhaust stroke to extract a maximal amount of work from the combustion.

Next, method 400 includes determining the temperature of the NOx trap at 404, and then comparing the determined temperature of the NOx trap at 406 to a predetermined minimum temperature threshold. If the temperature of the NOx trap is determined at 406 not to be below the predetermined minimum temperature threshold, then the NOx trap temperature is compared at 410 to a predetermined maximum temperature limit. If the temperature is not above the maximum at 410, then engine operation at the first exhaust valve timing is continued. On the other hand, if the temperature of NOx trap 50 is determined at 406 to be below the predetermined minimum temperature threshold, then an incremental advance of the exhaust valve timing, which may be combined with an increased volume of late fuel injection, is performed at 408 to provide a higher temperature exhaust to NOx trap 50. After performing the combustion with the second exhaust valve timing, the temperature of NOx trap 50 is again determined at 404 and is then compared to the predetermined minimum threshold at 406. If the temperature of NOx trap 50 is determined at 410 to be above the predetermined maximum temperature limit, then an incremental retard of the exhaust valve timing, which may be combined with a decreased volume of late fuel injection, is performed at 412. Combustion cycles with the new exhaust valve timing are performed, temperature of the NOx trap measured, evaluations of the temperature performed, and appropriate adjustment are made to the exhaust valve timing in a repeating cycle.

Figure 8:
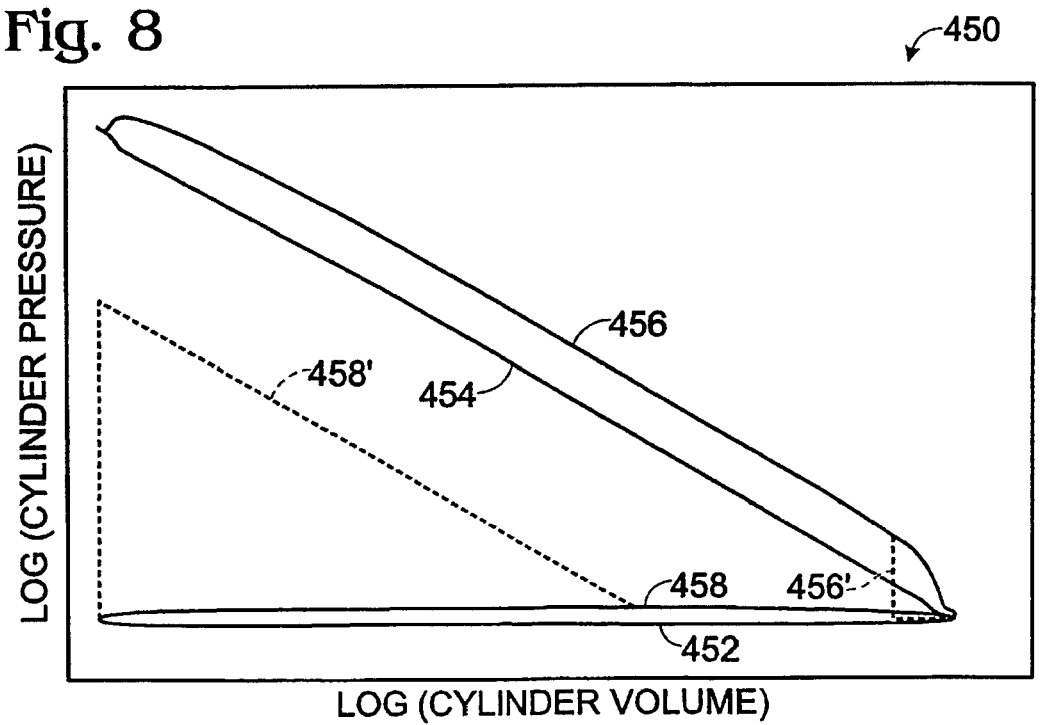
FIG. 8 is a graphical representation of the pressure and volume of a cylinder in a diesel engine during an entire four stroke cycle according to one implementation of the method of FIG. 7.

As described above, where the engine utilizes a camshaft to control the exhaust valve, the advancement of the exhaust valve opening may also result in the advancement of the closure of the exhaust valve. This may cause some exhaust to remain in combustion chamber 14, and also may result in some loss of efficiency due to the compression of remaining exhaust gases after closure of the exhaust valve. This is depicted graphically in FIG. 8, which shows a log(cylinder pressure) v. log(cylinder volume) plot 450 for an engine utilizing a sixty degree exhaust camshaft advancement (with no intake valve timing variation, and with no additional late injection of fuel) compared to conventional timing. The conventionally timed intake stroke is shown at 452, the conventionally timed compression stroke is shown at 454, the conventionally timed combustion stroke is shown at 456, and the conventionally timed exhaust stroke is shown at 458. The effect of the exhaust valve advancement on the combustion stroke is shown at 456', and the effect on the exhaust stroke is shown at 458'.

First, regarding the effect to the exhaust stroke, the early closing of the valve causes the piston to compress excess exhaust during a late phase of the exhaust stroke. This adds compression work, thereby resulting in some degree of engine braking. Regarding the effect on the combustion stroke, it can be seen that the early exhaust valve opening causes a sudden decrease in the pressure in the cylinder near the end of the combustion stroke compared to conventional valve timing. This indicates that less work is extracted by the piston, which leads to higher exhaust temperatures. A later injection of fuel would be expected to decrease the time and piston stroke available for the piston to extract work, thereby causing even higher exhaust temperatures. Furthermore, the amount (or pressure, etc.) of fuel injected at the second, later timing may be adjusted to further increase the exhaust temperature as necessary or desired. The selected degree of advancement of the exhaust valve opening therefore may be optimized to give an acceptable amount of exhaust heating while avoiding too great a degree of fuel efficiency loss due to early exhaust valve closing.

While described in the context of a NOx trap, it will be understood that the methods described herein may be used to maintain any temperature-sensitive aftertreatment device in a desired temperature range. Examples of other catalytic devices for which the methods shown and described herein may be used include, but are not limited to, HC-SCR (hydrocarbon selective catalytic reduction), Urea-SCR, three-way catalysts, and DPNR (diesel particulate NOx reduction)(4-way catalysts).

The systems and methods described above may also be used to provide temperature increases for other purposes than heating an aftertreatment device. For example, a diesel engine operating at light load and/or at idle may not provide sufficient heat to an engine coolant for cabin heating in cold weather. Therefore, the variable timing strategies described above may also be used to increase a coolant temperature to provide sufficient heat for cabin heating, etc.

Furthermore, various secondary benefits may be realized from the variable valve and/or camshaft timing strategies that are disclosed above. For example, retarding the closing of the intake valve may help to reduce cranking torque due to the lesser quantity of air in the cylinder relative to normal intake valve timing. This may be beneficial for use in a hybrid electric vehicle that uses frequent start/stop cycles.

Additional benefits may also be realized by control of the exhaust valve timing. For example, in embodiments that utilize a camshaft to control the exhaust valves, advancement of the exhaust valve opening also may advance the exhaust valve closing. This may help to produce additional engine braking in low load conditions. For example, in some situations, advancing the exhaust camshaft may not raise an exhaust temperature sufficiently to heat an aftertreatment device as quickly as desired, or to heat the aftertreatment device to a desired temperature. In these situations, an amount of fuel injected may be increased to increase the amount of energy released by combustion, and thereby to increase the exhaust temperature. However, increasing an amount of fuel injected may also increase engine torque, which may lead to an undesirable increase in engine speed in low load conditions. In this case, compression losses caused by closing the exhaust valve early and compressing residual exhaust gases may be used to offset the increase in torque caused by increasing the amount of fuel injected. This may allow more fuel to be injected without causing unwanted increases in engine speed. The same effect may be achieved in electromechanically actuated valves independent of the exhaust valve opening timing, allowing a desired amount of engine braking to be used to offset increases in torque, either with or without advancement of the timing of the exhaust valve opening. Furthermore, a similar effect may be achieved by retarding the opening of the intake valve, thereby causing pumping losses as the piston pulls a vacuum in an early phase of the intake stroke. This may be combined with retarding the closure of the intake valve, thereby further increasing the exhaust temperature as described above.

FIG. 9 depicts, generally at 500, an embodiment of an exemplary method of using a combination of the combustion of a greater quantity of fuel, combined with the adjustment of an intake or exhaust valve timing, to adjust an exhaust temperature to control the heat of an aftertreatment device (or coolant) without causing an undesirable change in engine torque. First, method 500 includes, at 502, performing one or more combustions with a first quantity of fuel. Next, at 504, a temperature of the aftertreatment device is determined, and is compared to a predetermined minimum threshold temperature at 506. If the temperature of the aftertreatment device is determined to be below a predetermined minimum threshold, then the quantity of fuel to be injected into the cylinder is increased by an increment at 508, an appropriate advance of the exhaust valve timing and/or retard of the intake valve timing is performed at 510 to reduce the engine's torque by an amount equivalent to the anticipated increase caused by the increase in fuel at 508, one or more combustions are performed at 502, the temperature measured again at 504, and the temperature compared again against the minimum threshold at 506. On the other hand, if the temperature of the aftertreatment device is determined to be greater than the predetermined threshold, then method 500 next includes, at 512 comparing the temperature against a maximum limit. If the temperature is above a predetermined maximum limit, a reduction in the quantity of fuel to be injected into the cylinder is performed at 514, a corresponding change in valve timing required to maintain the desired engine torque level is done at 516, one or more combustions are repeated at 502, temperature is measured at 504, etc. If the temperature is not above a predetermined maximum limit, no adjustments are made to the fuel quantity nor to the valve timing, and the combustion, temperature measurement and evaluation against minimum and maximum limits are performed in a repeating cycle. It should be noted that the engine operator or vehicle driver may be continually varying torque output from the engine. The operator controls the torque output by varying the base level of fuel injected into the cylinders. The control strategy illustrated in FIG. 9 may be performed on top of the input from the operator. That is, the adjustments performed to control engine torque at 510 and 516 are not intended to control the torque to a constant value, but instead to a level that may change in accordance with input from the engine operator or vehicle driver.

In yet another embodiment, exhaust valve timing and intake valve timing may be adjusted concurrently to increase the internal EGR and exhaust temperature. For example, early exhaust valve closure traps residual combustion gas which becomes internal EGR. When internal EGR is used in addition to conventional EGR, a total effective EGR rate can be increased. Thus, NOx emissions can be reduced. In addition, early exhaust valve closure timing may entail early exhaust valve opening which can cause lost expansion work and higher exhaust temperature. Although advancement of the exhaust valve timing alone may cause added pumping work, the concurrent retard of intake valve timing can avoid significant increase in pumping work (as described below referring to FIG. 12). Thus, a combination of advancement of exhaust timing and retardation of intake valve timing can increase the internal EGR and exhaust temperature without the pumping work penalty of advancement of exhaust valve timing alone.

One exemplary embodiment of a method of increasing internal EGR and providing higher exhaust temperature by a combination of earlier exhaust valve closure timing and later intake valve opening is shown generally at 600 in FIG. 10.

Figure 10:
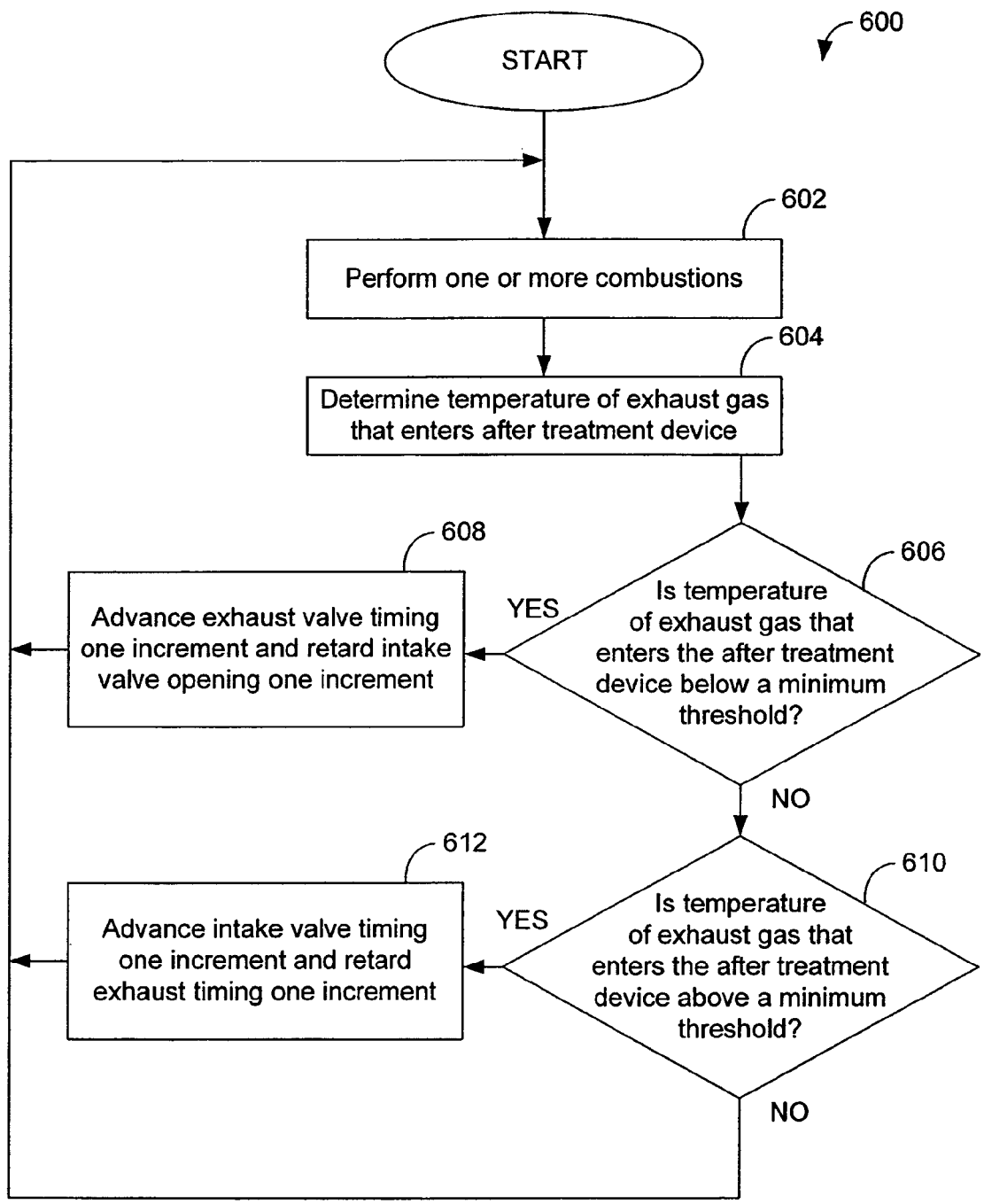
FIG. 10 is a flow diagram of an embodiment of a method of operating an engine for controlling NOx emissions and controlling temperature of an aftertreatment device.

FIG. 10 shows, generally at 600, a flow diagram depicting an exemplary method of controlling internal EGR and an exhaust temperature provided to aftertreatment device via the control of timing of intake valve 26 and exhaust valve 28. Method 600 includes, at 602, performing one or more combustions in combustion chamber 14 at a first exhaust valve timing and a first intake valve timing, which may be default exhaust valve timing and intake valve timing in some embodiments. For example, in some embodiments, the valve timing is configured to cause the engine to operate in a high efficiency early homogenization combustion mode. Next, method 600 includes determining the temperature of the exhaust gas that enters the aftertreatment device at 604, and then comparing the determined temperature of exhaust gas at 606 to a predetermined minimum temperature threshold. If the temperature of the exhaust gas is determined at 606 not to be below the predetermined minimum temperature threshold, then the exhaust gas temperature is compared at 610 to a predetermined maximum temperature limit. If the temperature is not above the maximum at 610, then combustion is continued at 602 with the same exhaust valve timing and intake valve timing, the temperature is measured again at 604, and compared to the minimum threshold at 606, etc. On the other hand, if the temperature of the exhaust gas is determined at 606 to be below the predetermined minimum temperature threshold, then an incremental advance of exhaust valve timing and an incremental retard of the intake valve timing are performed, at 608 to provide a higher internal EGR and a higher temperature exhaust gas entering into the aftertreatment device. After performing the combustion with the second exhaust intake valve timing and the second exhaust intake valve timing, the temperature of the exhaust gas is again determined at 604, and is then compared to the predetermined minimum threshold at 606. If the temperature of the exhaust gas is determined at 610 to be above the predetermined maximum temperature limit, then an incremental retard of the exhaust valve timing and an incremental advance of intake valve timing is performed at 612. Combustion cycles with the new intake valve timing are performed. The size of the retard and/or advance increments performed at 608 and 612 may be determined by hardware limitations or may be proportional to the amount of deviation of the temperature beyond the threshold at 606 and maximum limit at 610. Further, they may be different for advancing than retarding, or may change based on engine operating conditions as described herein.

For example, in one embodiment, the amount of intake valve opening retard is greater than the amount of exhaust valve closing advancement. In another example, the amount of intake valve opening retard is less than the amount of exhaust valve closing advancement. In still another embodiment, under different conditions, different relative amounts of advance and retard may be used. For example, under some conditions (e.g., temperatures, speeds, loads, current valve timing, etc.) the intake valve opening may be retarded to a greater extent the exhaust valve closing is advanced, yet under other conditions, the intake valve opening may be retarded to a lesser extant the exhaust valve closing is advanced.

Figure 11:
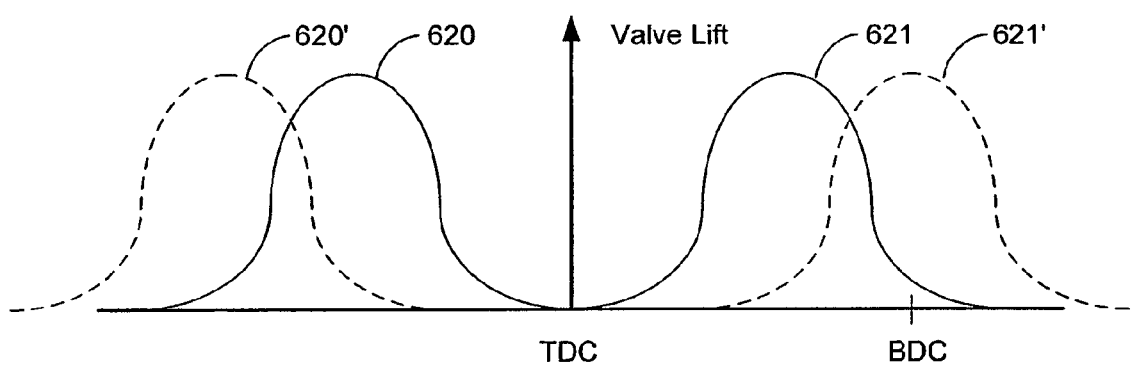
FIG. 11 shows an example of variable valve timing control.

FIG. 11 shows an example of variable valve timing as described above. Base exhaust valve timing is shown at 620, and base intake valve timing is shown at 621. Advanced exhaust valve timing is shown at 620', and retarded intake valve timing is shown at 621'. In this example, exhaust valve timing is advanced one increment and intake valve timing is retarded at the same increment, i.e., symmetric negative valve overlap is performed. It should be noted that the increment of exhaust valve advancement and the increment of intake valve retard may not be the same. For example, as described herein advancement may be greater than retard or vice versa.

Figure 12:
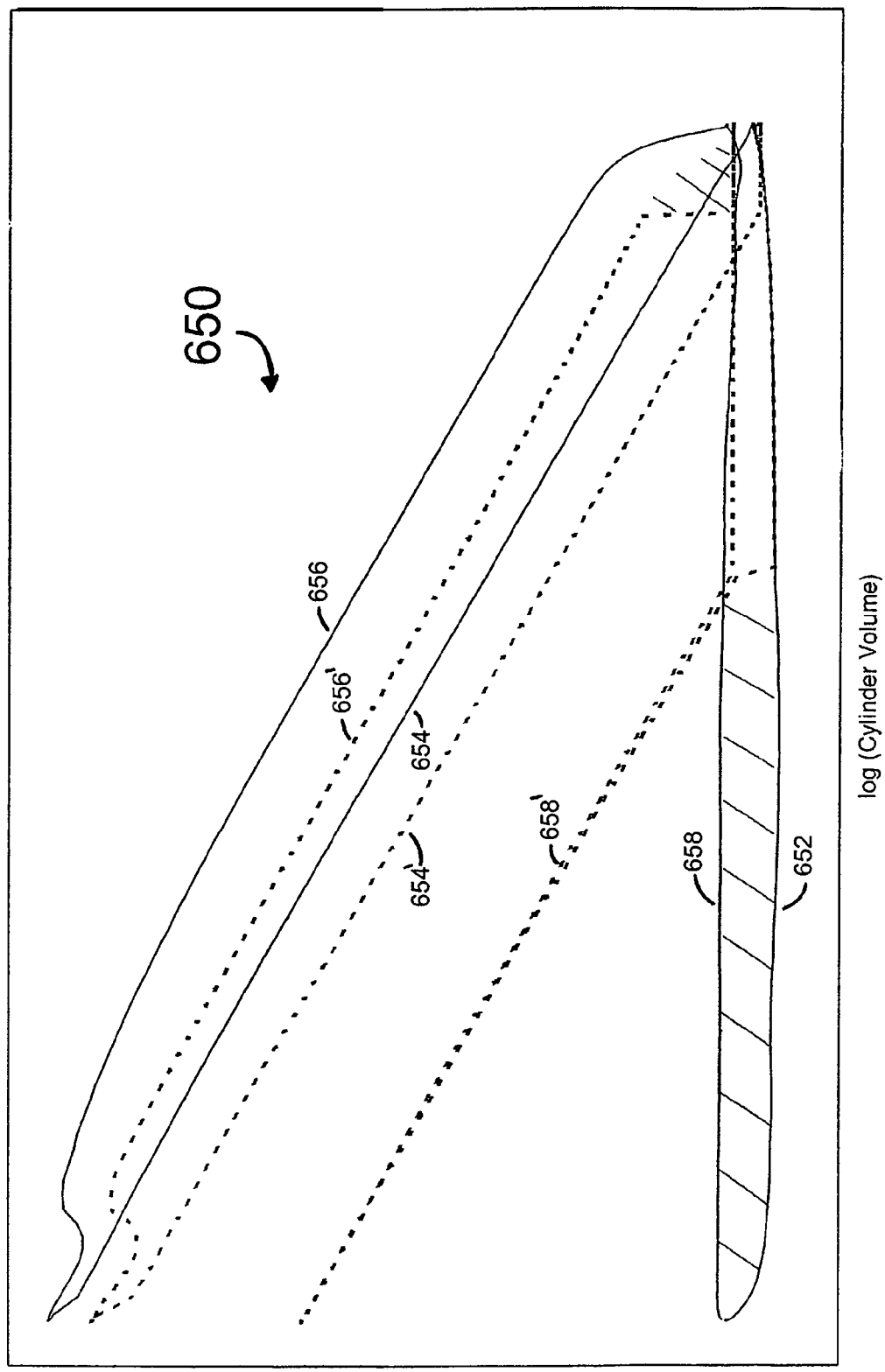
FIG. 12 is a graphical representation of the pressure and volume of a cylinder in a diesel engine during an entire four stroke cycle according to one implementation of the method of FIG. 10.

As stated above, the combination of early exhaust valve closure and late intake valve opening increases internal EGR and exhaust gas temperature without added pumping work. This is depicted graphically in FIG. 12, which shows a log (cylinder pressure) v. log(cylinder volume) plot 650 for an engine utilizing a sixty degree exhaust camshaft advancement and a sixty degree intake retard compared to conventional timing. FIG. 12 shows symmetric negative valve overlap on a diesel engine, which is estimated for 1500 RPM, 2.62 bar BMEP. The base timed intake stroke is shown at 652, the conventionally timed compression stroke is shown at 654, the base timed combustion stroke is shown at 656, and the base timed exhaust stroke is shown at 658. The effect of the exhaust valve advancement and intake valve retard on the combustion stroke is shown at 656', the effect on the compression stroke is shown at 654', and the effect on the exhaust stroke is shown at 658'.

First, regarding the effect to the exhaust stroke, the early closing of the exhaust valve causes the presence of excess exhaust gas or internal EGR during a late phase of the exhaust stroke, thus increasing pressure. This adds compression work during the exhaust stoke. Second, regarding the effect to the intake stroke, it can be seen that energy or work stored by excess exhaust is not released at the end of exhaust stroke due to late opening of intake valve. Thus, excess exhaust and associated work assist piston movement toward bottom dead center during intake stroke. Therefore, the overall effect on pumping work is small.

Next, regarding the effect on the compression and combustion strokes, it can be seen that the early exhaust valve opening causes a sudden decrease in the pressure in the cylinder at the end of the combustion stroke compared to conventional valve timing. This indicates that less expansion work is extracted by the piston, which leads to higher exhaust temperatures. Furthermore, FIG. 12 shows that the late intake valve closing causes the pressure and mass in the cylinder to be lower for both the compression and combustion strokes compared to conventional valve timing. The temperature is also lower due to reduced effective compression ratio. Decreased temperature decreases NOx emissions at equal injection timing or it could allow earlier injection timing at equal NOx emissions. Further, higher exhaust temperatures may be achieved via the injection of a similar amount of fuel as for the base timed cycle, but with less trapped air. In addition to the effect of reducing emissions, lower peak pressure is also a benefit to noise, vibration, and harshness (NHV) when NHV is a limit on injection timing. Thus, in one example, when advancing exhaust timing and retarding intake timing, injection timing may also be advanced.

This combination of variable valve timing can thus provide advantageous engine operation and NOx control. As described above, the combination of early exhaust valve closure timing and late intake valve opening timing can also increase exhaust temperature. Additionally, this combination of exhaust and intake valve timing adjustments can produce more internal EGR, which can also reduce NOx emissions. Furthermore, this combination of variable intake and exhaust valve timing is able to achieve a desired exhaust temperature with reduced NOx emissions and without sacrificing engine efficiency and pumping work.

In yet another embodiment, variable valve timing is adjusted depending on the amount of external EGR. For example, under decreased external EGR conditions, it may be desirable to advance exhaust valve closing (and opening) while retarding intake valve opening (and closing). Lower EGR rate can significantly increase NOx emissions. By considering both temperature and external EGR amounts, it may be possible to be responsive to decreased EGR conditions as well as decreased temperature conditions. Thus, NOx emissions may be reduced through control of both combustion in the engine and operating conditions of an aftertreatment device.

It will be further appreciated that the exhaust variable camshaft timing may be controlled alone to achieve increased internal EGR and higher exhaust temperature without degrading engine efficiency. For example, shorter exhaust cam duration may be used for the exhaust valve control. Thus, when the exhaust cam is advanced for early exhaust valve closure, exhaust valve opening time may not reduce engine efficiency.

Various constraints may need to be considered when implementing any of the diesel engine valve timing and/or camshaft timing strategies described above. For example, valve timing may be constrained by piston-valve clearance. Furthermore, a diesel engine may have a minimum acceptable air/fuel ratio, so the minimum aircharge allowable for a given amount of fuel injected may be taken into account when determining a suitable valve timing strategy. Likewise, possible valve-to-piston interference due to valve timing changes may be taken into account when implementing any of these strategies in a specific engine.

It will further be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

Furthermore, the concepts disclosed herein may be applied to spark ignition engines as well as diesel engines, for example, petrol and hydrogen ICE engines. Spark ignition engines generally perform fuel-air mixing before top dead center. However, combustion in these engines can also be broken into the following two modes that an engine may be configured to switch between to control NOx (or other) aftertreatment temperature. First, homogenization compression combustion ignition (HCCI), partial compression combustion ignition (PCCI), or similar combustion modes in spark ignition engines involve early fuel/air mixing and auto-ignition (ignition is typically unaided) at or near TDC due to compression heating. These combustion modes are similar to early homogenization in diesel engines. They are characterized by low NOx emissions and excellent efficiency compared to standard spark ignition (SI) combustion; however, exhaust temperatures are typically lower at a given load. Next, SI combustion is a mode of combustion in which ignition is brought about when a spark creates a flame kernel in the surrounding region. This flame front then moves through the combustion chamber. This mode of combustion is characterized by high NOx emissions, relatively low efficiency and high exhaust temperatures. In accordance with the concepts described above, compression combustion may be used as a default mode of the engine, and the intake valve timing, exhaust valve timing, and/or injection timing of the compression combustion may be varied when higher exhaust temperatures are desired to heat an aftertreatment device. These methods may also be used in combination with the late injection of fuel and/or spark ignition, which both tend to produce higher temperature exhausts.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of controlling a diesel engine including a combustion chamber, the engine coupled to an aftertreatment device configured to treat emissions from the diesel engine, a cylinder of the engine having an intake valve for passing air into the combustion chamber, and an exhaust valve for passing exhaust gas out of the combustion chamber, comprising:
    performing at least one combustion in the combustion chamber at a first exhaust valve closing timing and a first intake valve opening timing;
    if temperature of the exhaust gas is equal to or below a preselected temperature threshold, performing at least one combustion in the combustion chamber at a second, advanced exhaust valve closing timing and a second, retarded intake valve opening timing to thereby increase an internal exhaust gas recirculation and the temperature of the exhaust gas emitted by the diesel engine;
    where an advancement amount of the second exhaust valve closing timing and a retard amount of the second intake valve opening timing are equal; and
    if an external exhaust gas recirculation rate is below a preselected value, performing at least one combustion in the combustion chamber at a third, advanced exhaust valve closing timing to thereby increase the internal exhaust gas recirculation.

2. The method of claim 1, wherein the aftertreatment device includes a NOx trap.

3. The method of claim 1, wherein performing at least one combustion in the combustion chamber at the second exhaust valve closing timing and the second intake valve opening timing includes advancing a rotation of a camshaft that opens the exhaust valve and retarding a rotation of a camshaft that opens the intake valve.

4. The method of claim 1, wherein performing at least one combustion in the combustion chamber at the third exhaust valve closing timing includes advancing a rotation of a camshaft that opens the exhaust valve.

5. The method of claim 1, wherein exhaust valve closing timing and intake valve opening timing are controlled electronically.

6. The method of claim 1, wherein an advancement amount of the third exhaust valve closing timing is less than the advancement amount of the second exhaust valve closing timing.

7. A method of controlling a diesel engine including a combustion chamber, the engine coupled to an aftertreatment device configured to treat emissions from the diesel engine, the cylinder having an intake valve for passing air into the combustion chamber, and an exhaust valve for passing exhaust out of the combustion chamber, comprising:
    advancing exhaust valve opening timing and exhaust valve closing timing and retarding intake valve opening timing and intake valve closing timing during a first exhaust temperature;
    retarding exhaust valve opening timing and exhaust valve closing timing and advancing intake valve opening timing and intake valve closing timing during a second, higher, exhaust temperature;
    advancing exhaust valve opening timing and exhaust valve closing timing and retarding intake valve opening timing and intake valve closing timing during a first external exhaust gas recirculation condition; and
    retarding exhaust valve opening timing and exhaust valve closing timing and advancing intake valve opening timing and intake valve closing timing during a second, higher, external exhaust gas recirculation condition.

8. A method for controlling an engine coupled to an aftertreatment device comprising:
    operating in an HCCI mode;
    during the HCCI mode operation, advancing an exhaust valve closing timing and retarding an intake valve opening timing when a temperature of an exhaust gas is less than a first threshold, while maintaining combustion in the HCCI mode;
    determining the temperature of the exhaust gas after advancing the exhaust valve closing timing and retarding the intake valve opening timing; and
    retarding the exhaust valve closing timing and advancing the intake valve opening timing if the temperature of the exhaust gas determined after the advancing of the exhaust valve closing timing and retarding of the intake valve opening timing is greater than or equal to a second threshold that is different from the first threshold.

9. The method of claim 8, wherein the aftertreatment device includes a NOx trap.

10. The method of claim 8, where the advancing of the exhaust valve closing timing includes advancing a rotation of a camshaft that opens an exhaust valve and the retarding of the intake valve opening timing includes retarding a rotation of a camshaft that opens an intake valve.

11. The method of claim 8, where the exhaust valve closing timing and the intake valve opening timing are controlled electronically.

12. The method of claim 8, wherein an amount of exhaust valve advancement and an amount of intake valve retard are different.

13. The method of claim 8, further comprising advancing injection timing if the temperature of the exhaust gas is below the first threshold.

14. The method of claim 8, wherein an amount of exhaust valve advancement and an amount of intake valve retard are equal.

15. A method for controlling an engine coupled to an aftertreatment device comprising:

operating in an HCCI mode; and during the HCCI mode operation, advancing an exhaust valve closing timing and retarding an intake valve opening timing when a temperature of an exhaust gas is less than a first threshold, while maintaining combustion in the HCCI mode;

where an amount of exhaust valve advancement and an amount of intake valve retard are equal.

* * * * *